(12) United States Patent
Weisbach et al.

(10) Patent No.: US 8,360,664 B2
(45) Date of Patent: Jan. 29, 2013

(54) THERMAL IMAGING CAMERA WITH A FAST ELECTROMECHANICAL SHUTTER DEVICE

(75) Inventors: Frank Weisbach, Jena (DE); Bernd Schwarzer, Rothenstein (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 13/110,234

(22) Filed: May 18, 2011

(65) Prior Publication Data

US 2011/0299846 A1 Dec. 8, 2011

(30) Foreign Application Priority Data

Jun. 7, 2010 (DE) .......................... 10 2010 023 167

(51) Int. Cl.
*G03B 9/08* (2006.01)

(52) U.S. Cl. ...................................... 396/453

(58) Field of Classification Search .................. 396/453, 396/455, 463
See application file for complete search history.

(56) References Cited

U.S. PATENT DOCUMENTS

| | | | |
|---|---|---|---|
| 6,185,373 B1 | 2/2001 | Morishita | |
| 6,443,635 B1* | 9/2002 | Matsumoto et al. | 396/463 |
| 7,338,222 B2* | 3/2008 | Numnual et al. | 396/505 |
| 7,484,885 B1 | 2/2009 | Carlson et al. | |
| 2007/0063591 A1* | 3/2007 | Yasuda | 310/49 R |
| 2008/0211447 A1 | 9/2008 | Prasanna | |
| 2009/0162050 A1* | 6/2009 | Viglione et al. | 396/463 |

FOREIGN PATENT DOCUMENTS

| | | |
|---|---|---|
| DE | 32 28 089 C1 | 1/1984 |
| DE | 102008026903 A1 | 12/2008 |
| DE | 102008058798 A1 | 5/2010 |
| JP | 09325073 A | 12/1997 |
| JP | 10206923 A | 8/1998 |
| KR | 20030067213 A | 8/2003 |

* cited by examiner

*Primary Examiner* — Clayton E Laballe
*Assistant Examiner* — Noam Reisner
(74) *Attorney, Agent, or Firm* — McGlew and Tuttle, P.C.

(57) ABSTRACT

A thermal imaging camera, with an electromechanical shutter device for interrupting the ray path from time to time, has a motor (1), a motor shaft (2) and a shutter flag (3). The motor shaft (2) and the shutter flag (3) are in connection with one another via a crank-and-rocker mechanism. The crank-and-rocker mechanism includes a crank (4) rotatable about the motor shaft (2) with a crank pin (5) and with a rocker (6), at one end of which an elongated hole (8) is provided, which forms a rectilinear sliding joint together with the crank pin (5), and at the other end of which the shutter flag (3) is formed.

18 Claims, 3 Drawing Sheets

THERMAL IMAGING CAMERA WITH A FAST ELECTROMECHANICAL SHUTTER DEVICE

CROSS REFERENCE TO RELATED APPLICATIONS

This application claims the benefit of priority under 35 U.S.C. §119 of German Patent DE 10 2010 023 167.3 filed Jun. 7, 2010, the entire contents of which are incorporated herein by reference.

FIELD OF THE INVENTION

The present invention pertains to a thermal imaging camera with a shutter device.

BACKGROUND OF THE INVENTION

A thermal imaging camera with a shutter device is known from U.S. Pat. No. 7,484,885 B1.

It is common in thermal imaging cameras to briefly introduce a surface of a homogeneous temperature, which completely interrupts the ray path, into the ray path at regular intervals for image correction. Electromechanical shutter devices, which make possible a change in state between fully interrupted and fully open ray path especially extremely rapidly, are used for this.

A thermal imaging camera with an electromechanical shutter device, with which a shutter flag is pivoted into the ray path in order to make a temperature reference available for image correction, is known from U.S. Pat. No. 7,484,885 B1. The shutter flag is mounted eccentrically directly on the motor shaft of a motor and is rotated to and fro between two end positions correspondingly without transmission with the torque acting on the motor shaft. This leads to high acceleration peaks at the beginning and at the end of the motion and consequently to abrupt start and braking and great vibrations of the shutter flag when the end positions are reached.

Another drawback of the shutter device shown in U.S. Pat. No. 7,484,885 B1 is that pronounced electric current peaks develop in the motor during start-up and braking, which makes use especially difficult in areas with explosion hazard.

Assembly units for such fields of use have, as a rule, the "intrinsically safe" type of protection, i.e., no state leading to the ignition of an explosive gas-air mixture can develop even in case of error. This is usually achieved by limiting the current and voltage to values with which the needed ignition energy is not made available in case of short-circuits or during switching operations.

However, the dynamic characteristic deteriorates and the shutter device becomes slower if the electric power of the drive is limited to the permissible extent. The highly open optical systems employed in thermal imaging cameras require heavy shutters having a relatively large area, so that fast shutter devices, which meet the requirements of explosion protection, can hardly be embodied with this drive concept.

SUMMARY OF THE INVENTION

The object of the present invention is to provide a thermal imaging camera with an electromechanical shutter device with improved kinematics of the shutter flag, in which the shutter flag can be moved rapidly and without high acceleration peaks between two end positions, in which the shutter flag is located either fully in the ray path or fully outside the ray path of the thermal imaging camera, with only a low maximum electric power consumption of the motor.

The present invention shall be explained in more detail below by exemplary embodiments on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1A:
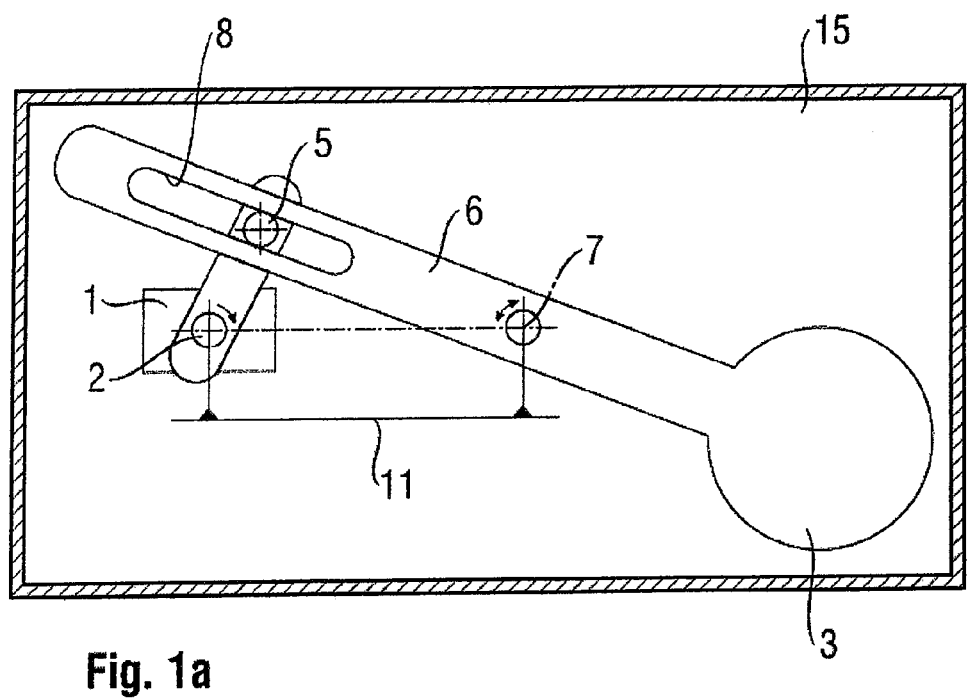
FIG. 1a is a schematic view showing an arrangement of a shutter device according to the present invention.

Referring to the drawings in particular, FIG. 1a shows a schematic arrangement of a thermal imaging camera (camera body) 15 according to the present invention, the view being limited to the features of the arrangement that are essential for the present invention, given by the electromechanical shutter device, for the sake of clarity.

The shutter device comprises essentially a motor 1 with a motor shaft 2 and a crank-and-rocker mechanism with rectilinear sliding joint.

The crank-and-rocker mechanism comprises a crank 4 and a rocker 6, with a shutter flag 3 being formed on said rocker 6.

Crank 4 is seated on the motor shaft 2 and may be both a connecting rod with a crank pin 5 formed at the free end thereof or a crank disk with an eccentrically arranged crank pin 5.

Rocker 6 is mounted rotatably on a pivot axis 7, which is arranged at a fixed distance from the motor shaft 2 via a frame 11 and is directed in parallel to the motor shaft 2 and encloses, via an elongated hole 8, which is formed at a first end of the rocker 6, a rectilinear sliding joint forming the crank pin 5 formed at the crank 4.

A rotary motion performed by crank 4 is converted into a pivoting motion with a pivot angle β.

The pivot angle β is defined by reversal points, at which the pivoting motion changes its pivoting direction. The pivot angle β can embodied to be certain and predetermined by dimensioning the crank-and-rocker mechanism, namely, the distances between the crank pin 5 and motor shaft 2, and between the pivot axis 7 and motor shaft 2, as well as the length of the elongated hole 8.

The shutter device is arranged in the thermal imaging camera 15 such that the shutter flag 3 can be brought into two selected positions.

In a first position (hereinafter called first end position), it shall fully interrupt the ray path in the thermal imaging camera 15, and it shall be located outside the ray path in a second end position (hereinafter called second end position). To make this possible, the rectilinear sliding joint is integrated in the thermal imaging camera 15 such that rocker 6 is pivotable in a plane extending at right angles to the ray path, and the size of the shutter flag 3 as well as rocker 6 and pivot angle $\beta$ are dimensioned correspondingly.

Especially for kinematic reasons, but also for reasons of saving space, the crank-and-rocker mechanism is dimensioned such that the two different end positions of the shutter flag 3 are assumed when rocker 6 is at its reversal points. This means that the maximum necessary change in the position of the shutter flag 3 for fulfilling its intended purpose is embodied by the maximum possible change in position, determined by the reversal points of rocker 6.

The crank-and-rocker mechanism may be designed as a revolving transmission, so that crank 4 can perform full revolutions, and the motor shaft 2 assumes alternatingly both angular positions in which the shutter flag 3 is in an end position each, while maintaining the same direction of rotation of the motor 1, and rocker 6 can be pivoted to and fro between the two end positions over the pivot angle $\beta$. Motor shaft 2 is rotated by two different angles of rotation a.

The crank-and-rocker mechanism may also be designed as a non-revolving transmission, so that it has two dead center positions, which are used as end positions, or the rotary motion of crank 4 is limited by stops. The direction of rotation of motor 1 must now be changed in order to pivot the shutter flag 3 from one end position into the other end position. It is advantageous for the kinematics of the shutter flag 3 if an equal angle of rotation $\alpha$ is swept each time by the motor shaft 2.

Stopping in the end positions can be brought about by actuating the motor 1 alone or it may be supported by stops having an additionally damping action, as it will be explained in more detail in the exemplary embodiments.

Regardless of whether motor 1 changes the direction of rotation or not, the angle of rotation a shall be defined below as the larger angle, about which the drive axis must be rotated between the two angular positions, because the better kinematics is obtained for this for the shutter flag 3.

The angle of rotation $\alpha$ is advantageously selected to be large, e.g., greater than 260°, as a result of which the change in the angular velocity of rocker 6 extends over larger angle ranges and the motion around the end positions becomes more damped.

Figure 1B:
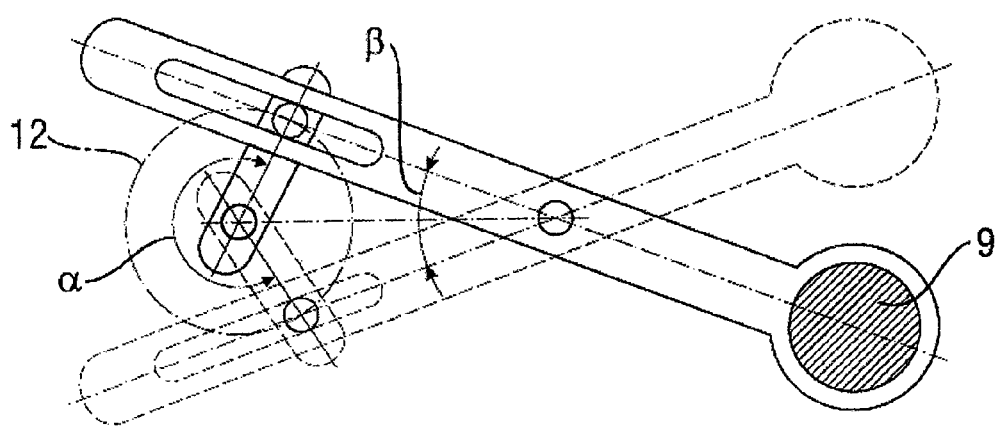
FIG. 1b is a schematic view showing the arrangement according to FIG. 1 in the two end positions.

FIG. 1*b* shows the schematic arrangement of the shutter device in the two end positions. Shutter flag 3 is always located in one of the two end positions when the imaginary distance lines between the crank pin 5 and motor shaft 2 or between crank pin 5 and pivot axis 7 form a right angle with one another.

The smaller the distance selected between the motor shaft 2 and pivot axis 7, the greater become the angle of rotation a of crank 4 and pivot angle $\beta$ of rocker 6.

The space provided for the shutter device in the thermal imaging camera 15 and the size of the cross section of the ray beam in the plane in which the shutter flag 3 shall be pivoted into the ray path are decisive for the dimensioning of the shutter device. It shall be assumed below for simplicity's sake that the ray beam has a round ray cross section 9 defined or set by the thermal imaging camera (camera body) 15 and the size of the cross section is consequently characterized by a ray beam diameter.

The shutter flag 3, which is advantageously round, compulsorily has a diameter that is larger than the ray beam diameter, as a result of which it is ensured that if the shutter device is arranged in a thermal imaging camera 15 as intended, the shutter flag 3 fully interrupts the ray beam during the pivoting of rocker 6 over a predetermined angle range (hereinafter called transition angle range) around or in front of the first end position (rocker 6 represented by a solid line in FIG. 1*b*).

Manufacturing and assembly tolerances can thus be compensated, and it can be ensured when the shutter flag 3 is pivoted into the end position that the ray path remains fully interrupted and a sufficient duration of interruption of the ray path is brought about, depending on the angular velocity of the motor shaft 2, in case the shutter flag 3 is possibly rotated beyond the first end position, which could be possible with the crank 4 revolving.

The pivot angle $\beta$ must be dimensioned as a function of the diameter of the shutter flag 3 and the distance between the shutter flag 3 and pivot axis 7 such that shutter flag 3 is located fully outside the ray path in the second end position (rocker 6 represented by a broken line in FIG. 1*b*).

The function of the shutter device will be described below.

The crank-and-rocker mechanism is in the state of rest, and the shutter flag 3 is in one of the end positions. To move the shutter flag 3 from this end position into the other end position, a torque is generated by the motor 1 on the motor shaft 2, said torque overcoming the total moment of inertia of the crank-and-rocker mechanism, including the shutter flag 3 formed on rocker 6, during the acceleration of the rotary motion (positive acceleration during the start-up and negative acceleration during braking) and moving the shutter flag 3 within a predetermined time to the other end position.

Due to the nonproportional transmission ratio of the angular velocity between crank 4 and rocker 6, which ratio changes over the angle of rotation $\alpha$ and at which ratio the angular velocity of rocker 6 decreases towards the reversal points, namely, end positions, and equals zero in the end positions, the moment of inertia of rocker 6 is small compared to the moment of inertia of crank 4 during the start-up and braking and has only a very slight effect on the torque to be applied, so that a lower torque needs to be applied compared to the shutter device known from the state of the art. An electric motor of a lower output can thus be used as the motor 1, and the requirements on the stability of the shutter device can be comparatively reduced, which also makes it possible to reduce the weight.

In addition, the shutter flag is moved markedly more slowly out of and into an end position, which in turn leads to a reduction of the build-up amplitude and a shortening of the build-up time into the end position and to impacting stops that may possibly be present.

Since a crank-and-rocker mechanism with a rectilinear sliding joint and its mode of operation in the area of transmission technology are known, a person skilled in the art, who is familiar with thermal imaging cameras and is basically a physicist and to whom the use of such a crank-and-rocker mechanism for a shutter device of a thermal imaging camera is made apparent by the present invention, can get advice from an engineer familiar with the field of the technology of mechanism design on how to design and dimension the shutter device in order to optimize it for the intended use in a thermal imaging camera to take full advantage of the advantageous effect thereof.

Figure 2A:
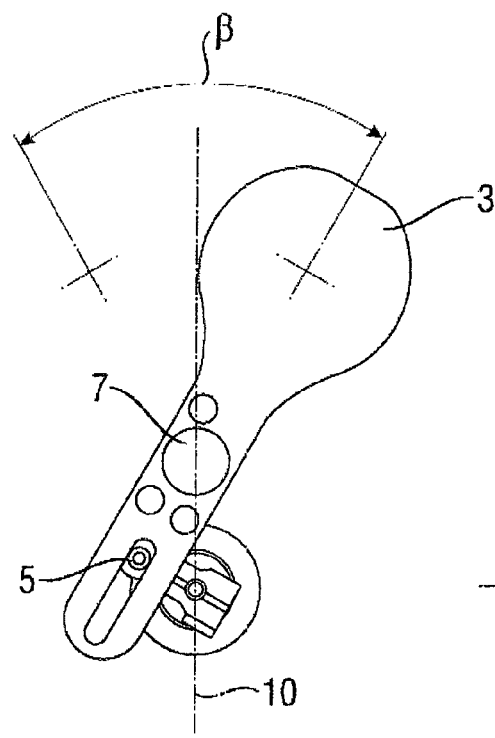
FIG. 2a is a front view showing a first exemplary embodiment of the invention.
Figure 2B:
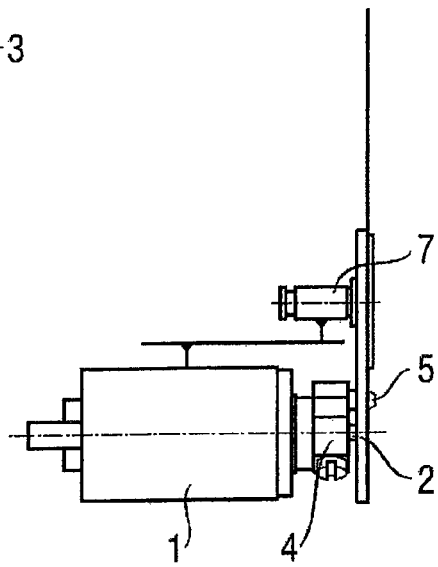
FIG. 2b is a side view showing a first exemplary embodiment of the invention.

FIGS. 2a and 2b show a front view and a side view of a first exemplary embodiment of a shutter device according to the present invention of a thermal imaging camera 15 with an advantageous dimensioning.

In this exemplary embodiment, the maximum pivot angle β of the shutter flag 3 equals 60°, the distance between the center of the shutter flag 3 and the plane of symmetry 10 between the fully pivoted-in state (first end position) and the fully pivoted-out state (second end position) equals 8.3 mm, the projection of the distance between the center of shutter flag 3 and motor shaft 2 onto the plane of symmetry 10 equals 24.1 mm, the distance between motor shaft 2 and pivot axis 7 of the shutter flag 3 equals 9.9 mm, the distance between crank pin 5 and motor shaft 2 equals 4.9 mm, and the distance between crank pin 5 and pivot axis 7 in the fully pivoted-in state equals 8.5 mm.

Figure 3A:
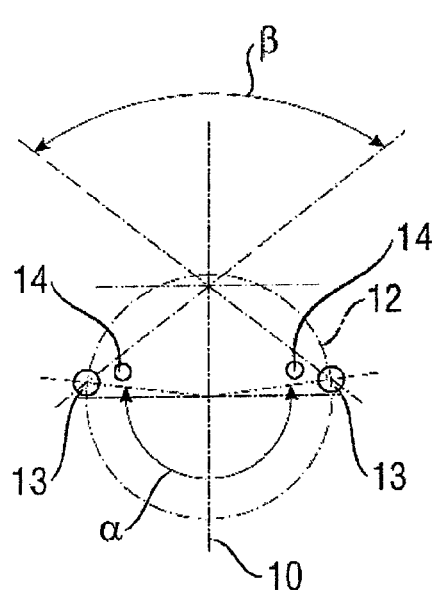
FIG. 3a is a front view showing magnets and stop positions and a movement path according to a second exemplary embodiment of the invention with magnets and stops.
Figure 3B:
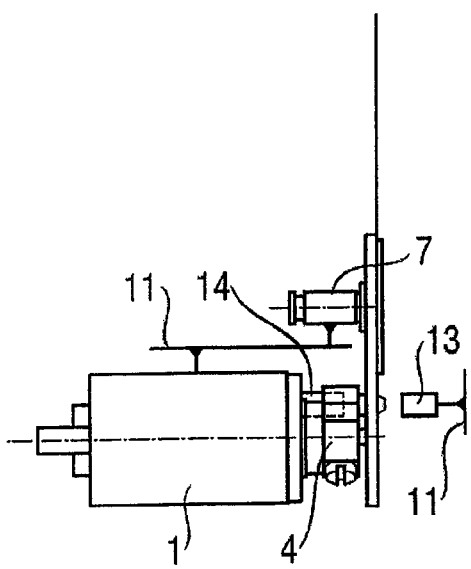
FIG. 3b is a side view showing a second exemplary embodiment of the invention with magnets and stops.

A second exemplary embodiment for a shutter device according to the present invention of a thermal imaging camera 15, shown in FIGS. 3a and 3b, has, in addition to the first exemplary embodiment, two magnets 13 and two stops 14, which are indirectly or directly connected with frame 11, which may be the housing of the thermal imaging camera.

Magnets 13 hold the shutter flag 3 (even with the motor not energized) in the end positions. The magnets 13 are always arranged aligned and at a certain distance from the crank pin 5 if the latter is in one of the angular positions where the shutter flag 3 is located in an end position. Crank pin 5 is made according to the second exemplary embodiment of a magnetically susceptible material, for example, soft iron, so that a force of attraction develops between the crank pin 5 and magnets 13, said force of attraction increasing with decreasing distance between the crank pin 5 and corresponding magnet 13.

The advantage over the use of a resetting spring is that the holding force acts practically only directly in the end positions, but the motion of the crank 4 is not hindered in the rest of the range of rotation.

In addition, a damping, mechanical stop 14, which consists, for example, at least partly of an elastomer, is provided each for both directions of rotation in this exemplary embodiment. To obtain good mechanical damping properties, the elastomer may be provided with air inclusions. An example of this is the material commonly called "cellular rubber." The spring force of stops 14 and the magnetic force of magnets 13 do not act directly on the shutter flag 3, but on crank 14 or crank pin 5 formed thereon or on a part connected to motor 1, so that the shutter flag 3 runs freely.

Crank 4 cannot be rotated through completely in this exemplary embodiment regardless of whether the crank-and-rocker mechanism is designed as a revolving or non-revolving transmission, but it moves only between a first angular position, in which the shutter flag 3 is in the first end position, and a second angular position, in which the shutter flag 3 is in the second end position. One of the magnets 13 is located in these angular positions. It is also possible to provide one magnet 13 only, which is now in the angular position in which the shutter flag 3 is in the first end position.

The dynamic effect of the stops 14 is opposite the restoring force of the magnets 13. To prevent the shutter flag 3 from rebounding and to ensure that it is held by the magnets 13 in the end positions, effective damping is necessary. It must absorb and dissipate the mechanical energy of the shutter flag 3, so that this comes to rest rapidly in the end positions.

The at least partly elastic material is therefore selected to be such that its damping is strong enough in relation to its elastic restoring force and to the holding force of the magnets for the magnet to hold the crank-and-rocker mechanism in its range of action after the first vibration amplitude.

The shutter device may also be provided only with damping stops 14 or with only magnets 13.

Figure 4A:
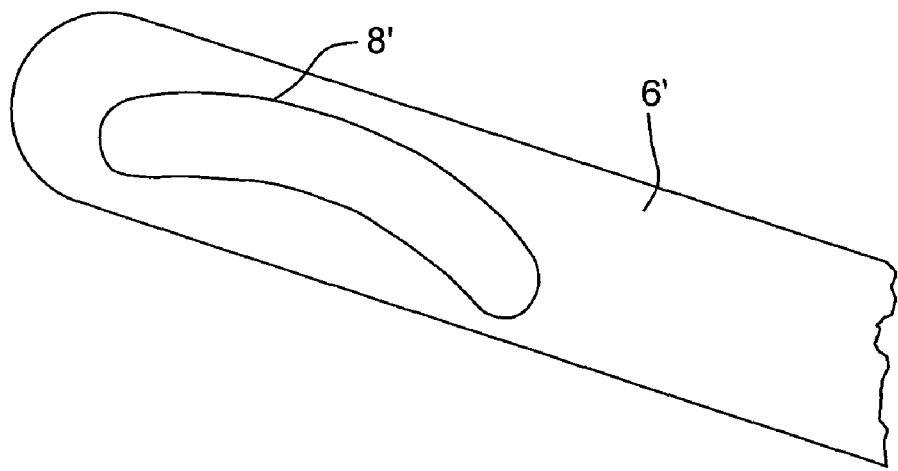
FIG. 4a is a cutaway view of a rocker with a curved elongated hole.
Figure 4B:
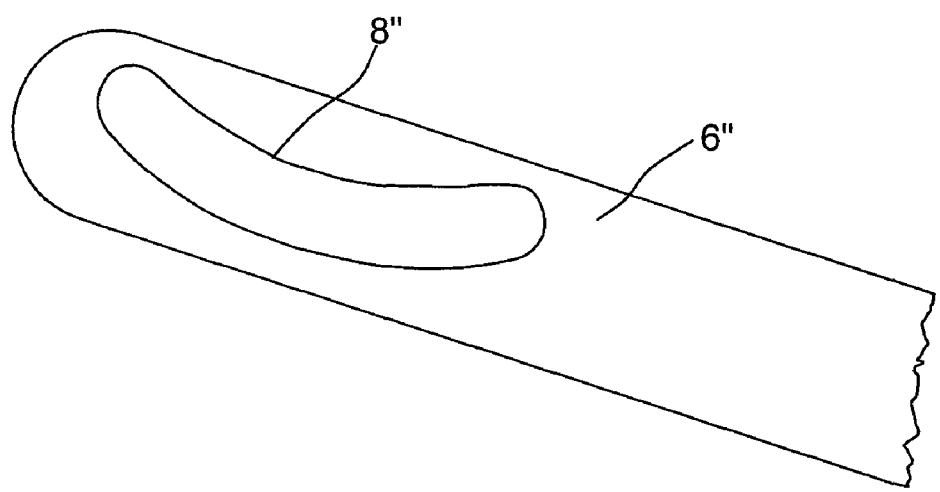
FIG. 4b is a cutaway view of a rocker with another curved elongated hole 8.

Instead of a straight elongated hole 8, as is shown in FIG. 1a, rocker 6 may also have a curved elongated hole 8, with which the transmission ratio can be changed. Curved elongated holes 8' and 8" for alternative rockers 6' and 6" are shown in FIGS. 4a and 4b respectively.

In particular, the elongated hole 8 may be curved in a circular pattern or have a circular curvature at its ends only. The curvature may point toward the motor shaft 2 or away from same, whereby the pivot angle β of rocker 6 can be changed without the crank-and-rocker mechanism otherwise having to change its dimension.

A shutter device according to the present invention is characterized by its comparatively low effective moment of inertia, so that the shutter flag 3 can be brought into two different selected end positions with only a low maximum electric power consumption of the motor 1, which is especially below the permissible values of explosion protection (e.g., 1.0 . . . 1.3 W; ATEX Product Guideline 94/9/EG, Group II T4) within a short time, i.e., especially within the duration of a video frame, which is, e.g., 1/50 or 1/60 second. The mechanical time constant is lower than that of a direct drive.

The shutter flag 3 describes a nearly bounce-free, harmonic motion without acceleration peaks.

Motor 1 has to produce a weak holding force or no holding force to hold the shutter flag 3 in the end positions. The shutter device can be embodied with small dimensions and low weight.

While specific embodiments of the invention have been shown and described in detail to illustrate the application of the principles of the invention, it will be understood that the invention may be embodied otherwise without departing from such principles.

APPENDIX

List of Reference Numbers

1 Motor
2 Motor shaft
3 Shutter flag
4 Crank
5 Crank pin
6 Rocker
7 Pivot axis
8 Elongated hole
9 Ray cross section
10 Plane of symmetry
11 Frame
12 Circular path of crank pin
13 Magnet
14 Stop
15 Thermal imaging camera
α Angle of rotation of crank
β Pivot angle of rocker

What is claimed is:

1. A thermal imaging camera with an electromechanical shutter device for interrupting a ray path from time to time, the electromechanical shutter device comprising: a motor; a motor shaft driven by said motor; a shutter flag; and a crank-and-rocker mechanism connecting said motor shaft and said shutter flag, said crank-and-rocker mechanism comprising a crank rotatable about said motor shaft, a crank pin mounted on said crank, a rocker and a pivot axis arranged in parallel to said motor shaft, said rocker being pivotally mounted on the pivot axis, said rocker having an elongated hole provided at or adjacent to one end of said rocker and said shutter flag being formed at or adjacent to another end of said rocker, said elongated hole forming a sliding joint together with said crank pin, with which said rocker is pivoted by a pivot angle between first and second selected positions, said first selected position completely interrupting the ray path and said second selected position arranging said shutter completely out of the ray path, said sliding joint transforming an angular velocity of said crank into an angular velocity of said rocker, said sliding joint causes the angular velocity of said crank to transform into a reduction to a zero angular velocity of said rocker as said rocker approaches said two first and second selected positions; and wherein said crank moves through a pivot angle to move said rocker between said first and second positions, said crank and said rocker are arranged to have said pivot angle be greater than 260°.

2. A thermal imaging camera in accordance with claim 1, wherein the elongated hole has a curved shape.

3. A thermal imaging camera in accordance with claim 1, wherein said crank pin consists of a magnetically susceptible material and a magnet is arranged aligned with said magnetically susceptible material at a certain distance when said rocker is located at one of said first and second selected positions.

4. A thermal imaging camera in accordance with claim 1, further comprising damping stops arranged such that said crank comes into contact with one of said damping stops when said rocker arrives at one of said first and second selected positions.

5. A thermal imaging camera in accordance with claim 3, wherein said shutter device has two magnets and two stops.

6. A thermal imaging camera comprising: a camera body with an opening providing a ray path; an electromechanical shutter device connected to said camera body for interrupting the ray path, the electromechanical shutter device comprising: a motor; a motor shaft driven by said motor; a shutter flag; and a crank-and-rocker mechanism connecting said motor shaft and said shutter flag, said crank-and-rocker mechanism comprising a crank rotatable about said motor shaft, a crank pin mounted on said crank, a rocker and a pivot axis arranged in parallel to said motor shaft, said rocker being pivotally mounted on said pivot axis, said rocker having a slot forming a sliding joint together with said crank pin, with which said rocker is pivoted by a pivot angle between first selected position and a second selected position, said first selected position completely interrupting the ray path, and said second selected position arranging the shutter completely out of the ray path, said shutter flag being formed at an end of said rocker spaced apart a distance from the slot, said crank and said rocker being arranged to move said shutter flag more slowly into and out of said first and second selected positions with a constant angular velocity of said crank, then when said shutter flag is halfway between said first and second selected positions; and wherein said crank moves through a pivot angle to move rocker between said first and second positions, said crank and said rocker are arranged to have said pivot angle be greater than 260°.

7. A thermal imaging camera in accordance with claim 6, wherein the slot has a curved shape.

8. A thermal imaging camera in accordance with claim 6, wherein said crank pin is formed of a magnetically susceptible material and a magnet is arranged aligned with said magnetically susceptible material at a certain distance when said rocker is located at one of said first and second selected positions.

9. A thermal imaging camera in accordance with claim 6, further comprising:
a first damping stop associated with the first selected position; and
a second damping stop associated with the second selected position, wherein said crank comes into contact with said first damping stop when said rocker arrives at the first selected position and said crank comes into contact with said second damping stop when said rocker arrives at the second.

10. A thermal imaging camera in accordance with claim 6, further comprising:
a first magnet associated with the first selected position; and
a second magnet associated with the second selected position, wherein at least one of said crank pin and said crank is formed of a magnetically susceptible material and said first magnet is arranged aligned with said magnetically susceptible material at a certain distance when said rocker is located at the first selected position and said second magnet is arranged aligned with said magnetically susceptible material at a certain distance when said rocker is located at the second selected position.

11. A thermal imaging camera comprising: a camera body defining an opening providing a ray path for the camera; a motor mounted on said camera body, said motor having a driven motor shaft; a crank connected to said motor shaft, said crank having a crank pin; a rocker pivotably mounted on said camera body about a pivot axis, said rocker being pivotable between a first position and a second position, said rocker having a shutter flag on one end, said first position of said rocker arranging said shutter flag to block said opening in said camera body and block said ray path of the camera, said second position of said rocker arranging said shutter flag to be completely spaced from said opening of said camera body and from said ray path of the camera, said pivot axis being arranged parallel to said motor shaft, said pivot axis being spaced from said motor shaft, said rocker defining a slot forming a sliding joint with said crank pin, said crank and said rocker being arranged to have said motor move said rocker between said first and second positions, said crank and said rocker being arranged to minimize a torque required from said motor to move said rocker from a stopped state in one of said first and second positions toward the other of said second and first positions; and wherein said crank moves through a pivot angle to move said rocker between said first and second positions, said crank and said rocker are arranged to have said pivot angle be greater than 260°.

12. A thermal imaging camera in accordance with claim 11, wherein:
said crank and said rocker are arranged to minimize a torque required to slow said rocker into a stopped state at one of said first and second positions while moving from the other of said second and first positions.

13. A thermal imaging camera in accordance with claim 11, wherein:
said sliding joint transforms an angular velocity of said crank into an angular velocity of said rocker, said sliding joint causes the angular velocity of said crank to transform into a reduction of an angular velocity of said rocker as said rocker approaches said first and second positions.

14. A thermal imaging camera in accordance with claim 11, wherein:
said sliding joint varies an angular velocity ratio between said rocker and said crank, said sliding joint causes said angular velocity ratio to approach zero as said rocker approaches said first and second positions.

15. A thermal imaging camera in accordance with claim 11, wherein:
said crank and said rocker are arranged to minimize a moment of inertia of said crank and said rocker at said first and second positions.

16. A thermal imaging camera in accordance with claim 11, wherein:
a moment of inertia of said rocker is smaller than a moment of inertia of said crank at said first and second positions.

17. A thermal imaging camera in accordance with claim 11, wherein:
said crank and said rocker are arranged to move said shutter flag more slowly into and out of said first and second positions with a constant angular velocity of said crank, then when said shutter flag is halfway between said first and second positions.

18. A thermal imaging camera in accordance with claim 11, further comprising:
forming said crank pin of a magnetically susceptible material;
a magnet arranged on said camera body to apply a magnetic force to said crank pin and hold said rocker in one of said first and second positions.

* * * * *